(12) United States Patent
McDonald et al.

(10) Patent No.: US 11,571,637 B2
(45) Date of Patent: Feb. 7, 2023

(54) SPACERS FOR ION-EXCHANGE DEVICE

(71) Applicant: Magna Imperio Systems Corp., Houston, TX (US)

(72) Inventors: Brian M. McDonald, Houston, TX (US); Michael James Connor, Jr., Porter, TX (US)

(73) Assignee: Magna Imperio Systems Corp., Houston, TX (US)

( * ) Notice: Subject to any disclaimer, the term of this patent is extended or adjusted under 35 U.S.C. 154(b) by 0 days.

(21) Appl. No.: 17/705,862

(22) Filed: Mar. 28, 2022

(65) Prior Publication Data

US 2022/0219098 A1 Jul. 14, 2022

Related U.S. Application Data

(62) Division of application No. 16/685,617, filed on Nov. 15, 2019, now Pat. No. 11,311,820.

(60) Provisional application No. 62/768,644, filed on Nov. 16, 2018.

(51) Int. Cl.
| | |
|---|---|
| *B01D 15/36* | (2006.01) |
| *B01D 61/50* | (2006.01) |
| *B01D 61/42* | (2006.01) |
| *B01D 65/00* | (2006.01) |

(52) U.S. Cl.
CPC ......... *B01D 15/361* (2013.01); *B01D 61/422* (2013.01); *B01D 61/50* (2013.01); *B01D 65/003* (2013.01)

(58) Field of Classification Search
CPC .... B01D 15/361; B01D 61/422; B01D 61/50; B01D 2313/10; B01D 2313/12
See application file for complete search history.

(56) References Cited

U.S. PATENT DOCUMENTS

| | | | |
|---|---|---|---|
| 3,878,086 | A | 4/1975 | Haswell et al. |
| 3,933,617 | A | 1/1976 | Yamamoto et al. |
| 4,183,749 | A | 1/1980 | Yabe et al. |
| 4,253,928 | A | 3/1981 | Blytas et al. |
| 4,303,493 | A | 12/1981 | Kneifel et al. |

(Continued)

FOREIGN PATENT DOCUMENTS

| | | |
|---|---|---|
| FR | 2116845 A5 | 7/1972 |
| GB | 1268182 A | 3/1972 |

(Continued)

OTHER PUBLICATIONS

Extended European Search Report dated Jul. 7, 2022, directed to EP Application No. 19896649.1; 15 pages.

(Continued)

*Primary Examiner* — Bradley R Spies
(74) *Attorney, Agent, or Firm* — Morrison & Foerster LLP

(57) ABSTRACT

Provided are spacers, ion-exchange devices comprising spacers, and methods of preparing spacers for improved fluid distribution and sealing throughout an ion-exchange device. These spacers can include an internal cavity surrounded by a perimeter of the spacer. The perimeter can have a first opening and a second opening within the perimeter, and the first opening and the second opening can be located on opposite sides of the internal cavity. The spacers can also have a first and second plurality of channels located within the perimeter, wherein each channel of the first and second plurality of channels extends from the internal cavity towards the first opening or the second opening.

10 Claims, 9 Drawing Sheets

(56) References Cited

U.S. PATENT DOCUMENTS

| | | | |
|---|---|---|---|
| 4,319,978 | A | 3/1982 | Millman |
| 4,569,747 | A | 2/1986 | Kedem et al. |
| 5,187,025 | A | 2/1993 | Kelland et al. |
| 5,681,438 | A | 10/1997 | Proulx |
| 6,090,258 | A | 7/2000 | Mirsky et al. |
| 6,156,180 | A | 12/2000 | Tessier et al. |
| 6,235,166 | B1 | 5/2001 | Towe et al. |
| 8,313,651 | B2 | 11/2012 | Childs et al. |
| 8,652,705 | B2 | 2/2014 | Berta et al. |
| 9,169,138 | B2 | 10/2015 | Sparrow et al. |
| 9,422,176 | B2 | 8/2016 | Ng et al. |
| 2002/0163101 | A1 | 11/2002 | Cotton et al. |
| 2005/0150768 | A1 | 7/2005 | Sferrazza |
| 2006/0275859 | A1 | 12/2006 | Kjaer |
| 2007/0215474 | A1 | 9/2007 | Batchelder et al. |
| 2010/0326833 | A1 | 12/2010 | Messalem et al. |
| 2013/0126353 | A1 | 5/2013 | Perez et al. |
| 2014/0251896 | A1 | 9/2014 | Hirozawa et al. |
| 2017/0036171 | A1 | 2/2017 | Lienhard et al. |
| 2018/0353909 | A1 | 12/2018 | Van Der Burg et al. |
| 2020/0155967 | A1 | 5/2020 | Mcdonald et al. |
| 2020/0324249 | A1 | 10/2020 | Li et al. |
| 2020/0406194 | A1 | 12/2020 | Demeter |
| 2022/0212124 | A1 | 7/2022 | McDonald et al. |

FOREIGN PATENT DOCUMENTS

| | | |
|---|---|---|
| WO | 97/28889 A1 | 8/1997 |
| WO | 02/26365 A1 | 4/2002 |
| WO | 03/020645 A2 | 3/2003 |
| WO | 2017/089747 A1 | 6/2017 |

OTHER PUBLICATIONS

Li et al., U.S. Office Action dated Jun. 15, 2022, directed to U.S. Appl. No. 16/844,787; 8 pages.

International Preliminary Report on Patentability dated May 18, 2021, directed to International Application No. PCT/IB2019/001306; 8 pages.

International Search Report and Written Opinion dated Jul. 17, 2020, directed to International Application No. PCT/US20/27517; 15 pages.

International Search Report and Written Opinion dated Nov. 19, 2020, directed to International Application No. PCT/US20/39405; 18 pages.

International Search Report and Written Opinion dated Sep. 28, 2020, directed to International Application No. PCT/IB19/01306; 22 pages.

Invitation to Pay Additional Fees dated Jul. 27, 2020, directed to International Application No. PCT/IB19/01306; 3 pages.

Invitation to Pay Additional Fees dated Sep. 15, 2020, directed to International Application No. PCT/US20/39405; 3 pages.

Mcdonald et al., Office Action dated May 19, 2021, directed to U.S. Appl. No. 16/685,617; 11 pages.

Mcdonald et al., Office Action dated Sep. 3, 2021, directed to U.S. Appl. No. 16/685,617; 10 pages.

Reig et al. (Nov. 2016). "Integration of monopolar and bipolar electrodialysis for valorization of seawater reverse osmosis desalination brines: Production of strong acid and base," Desalination 398: 29 pages.

SPACERS FOR ION-EXCHANGE DEVICE

REFERENCE TO RELATED APPLICATIONS

This application is a divisional of U.S. application Ser. No. 16/685,617, filed Nov. 15, 2019, which claims the benefit of U.S. Provisional Application No. 62/768,644, filed Nov. 16, 2018, the entire contents of both of which are incorporated herein by reference.

FIELD OF THE DISCLOSURE

This disclosure relates to spacers for a membrane-based desalination device. More particularly, this disclosure relates to spacers for improved flow distribution through an intermembrane chamber and across an ion-exchange membrane of an ion-exchange device, as well as improved external and internal seals of an ion-exchange device.

BACKGROUND OF THE DISCLOSURE

Electrodialysis is one example of a membrane-based large scale desalination method. Specifically, electrodialysis can be used in an ion-exchange device to selectively remove positive and negative ions from a water source (e.g., brackish water or brine solution produced in reverse osmosis units) by transporting salt ions from one solution to another by way of ion-exchange membranes. For optimal performance, an ion-exchange device employing electrodialysis utilizes an electrical current to separate charged ions from the water flowing through the device. For example, an ion-exchange device can include a pair of electrodes, alternating anionic and cationic exchange membranes, and spacers. A voltage can be applied to one or more of the electrodes to initiate an electrochemical reaction. The alternating cationic exchange membranes and anionic exchange membranes can selectively remove ions from a first stream of fluid while introducing the removed ions to an adjacent, second stream of fluid.

The spacers of an ion-exchange device can be placed between the alternating ion-exchange membranes. Spacers are used to create separation between ion-exchange membranes and form intermembrane chambers, which allow the passage of fluid. Spacers are also used to form internal seals between adjacent intermembrane chambers of the device and external seals to protect the fluid flowing through the device from the external environment.

Some ion-exchange devices may include additional components to help seal the device. For example, sealing components may include adhesives, o-rings, and/or mechanical seals.

SUMMARY OF THE DISCLOSURE

Provided are improved spacer borders and methods for preparing improved spacer borders for use in a membrane-based desalination device. Particularly, the devices, methods, and techniques provided are for spacer borders that have improved sealing characteristics and enable improved fluid distribution across an ion-exchange membrane (i.e., cationic-exchange membranes ("CEMs") and anionic-exchange membranes ("AEMs")).

Spacer borders and methods of fabricating spacer borders provided herein can provide improved external seals along the outside of an ion-exchange device and improved internal seals along adjacent intermembrane chambers within an ion-exchange device. Specifically, improved external seals can maximize hydraulic recovery, minimize safety hazards to operators, and protect the fluid flowing through the ion-exchange device from the external environment. Improved internal seals can minimize cross-contamination from one intermembrane chamber to another and can maximize production rates. Improved flow distribution can maximize the effective area of charge transfer on an ion-exchange membrane surface and the capacity of the ion-exchange device. Accordingly, spacer borders and methods for preparing spacer borders for ion-exchange devices provided herein can maximize: hydraulic recovery, production rates, the effective area of charge transfer on an ion-exchange membrane surface, and the capacity of the ion-exchange device; and can minimize: safety hazards and cross-contamination.

Unlike the sealing components mentioned above (i.e., adhesives, o-rings, and mechanical seals), spacer borders disclosed herein can be more effective, more reliable, and use less component parts. Specifically, many adhesives suitable for sealing an ion-exchange device suffer due to repeated swelling and shrinking of the ion-exchange membranes caused by environmental conditions and water quality. This swelling and shrinking of an ion-exchange membrane weakens the seal over time and ultimately creates leaks throughout the system. O-rings inherently add an additional mechanical component and thus an additional degree of complexity. This additional component and increased complexity can introduce misalignment problems in a membrane stack of an ion-exchange device. And finally, mechanical seals require a significant compression force to seal the flat surfaces of the spacer borders against a surface of an ion-exchange membrane. Accordingly, improved spacer borders and methods for preparing improved spacer borders provided herein can minimize water permeability of the membrane, can minimize the number of additional component parts, and can minimize the compression force required to seal components of the device.

One type of spacer border for use in an ion-exchange device includes an internal cavity filled with fabric or mesh. Spacer borders of this configuration provide support to the ion-exchange membranes across a length of the device and can provide more reliable external and internal seals throughout the device.

In some embodiments, a spacer for an ion-exchange device is provided, the spacer comprising: a spacer mesh; and a spacer border comprising: an internal cavity surrounded by a perimeter of the spacer border; a first opening and a second opening within the perimeter of the spacer border, wherein the first opening and the second opening are located on opposite sides of the internal cavity; a first plurality of channels located within the perimeter and between the first opening and the internal cavity, wherein each channel of the first plurality of channels extends from the internal cavity towards the first opening; and a second plurality of channels located within the perimeter and between the second opening and the internal cavity, wherein each channel of the second plurality of channels extends from the internal cavity towards the second opening.

In some embodiments of the spacer, the spacer border comprises a polymer having a stiffness greater than 2.5 GPa.

In some embodiments of the spacer, the spacer border comprises polyethylene terephthalate.

In some embodiments of the spacer, each channel of the first plurality of channels and each channel of the second plurality of channels comprises a width from 0.005 inches to 0.015 inches.

In some embodiments of the spacer, the first plurality of channels is oriented in a first array configuration and the second plurality of channels is oriented in a second array configuration.

In some embodiments of the spacer, the spacer comprises a thickness of 0.003 inches to 0.020 inches.

In some embodiments of the spacer, the spacer comprises a thickness of 0.003 inches to 0.010 inches.

In some embodiments of the spacer, an end of each channel of the first plurality of channels and an end of each channel of the second plurality of channels opens into the internal cavity.

In some embodiments of the spacer, the first array configuration is spatially related to the second array configuration such that the first array configuration is a 180° rotation of the second array configuration with respect to a central location of the spacer.

In some embodiments of the spacer, the spacer mesh and the spacer border are integral.

In some embodiments of the spacer, the spacer mesh and the spacer border are separate components.

In some embodiments, an ion-exchange device is provided, the ion-exchange device comprising: a first electrode; a first cationic-exchange membrane; a first intermembrane chamber comprising a first spacer border, the first spacer border comprising a first internal cavity, a first opening, and a first plurality of channels; a first anionic-exchange membrane; a intermembrane chamber comprising a second spacer border, the second spacer border comprising a second internal cavity, a second opening, and a second plurality of channels; a second cationic-exchange membrane; and a second electrode, wherein the first electrode, the first cationic-exchange membrane, the first spacer, the first anionic-exchange membrane, the second spacer, the second cationic-exchange membrane, and the second electrode are sandwiched between a pair of compression plates, and wherein the first plurality of channels is located between the first opening and the first internal cavity of the first spacer border, wherein each channel of the first plurality of channels extends from the first internal cavity towards the first opening, and the second plurality of channels is located between the second opening and the second internal cavity of the second spacer border, wherein each channel of the second plurality of channels extends from the second internal cavity towards the second opening of the second spacer border.

In some embodiments of the ion-exchange device, the first spacer border and the second spacer border comprise a polymer having a stiffness greater than 2.5 GPa.

In some embodiments of the ion-exchange device, the first spacer border and the second spacer border comprise polyethylene terephthalate.

In some embodiments of the ion-exchange device, the channels of the first plurality of channels and the channels of the second plurality of channels each comprise a width of 0.005 inches to 0.015 inches.

In some embodiments of the ion-exchange device, the first spacer and the second spacer each comprise a thickness of 0.003 inches to 0.020 inches.

In some embodiments of the ion-exchange device, the first spacer and the second spacer each comprise a thickness of 0.003 inches to 0.010 inches.

In some embodiments of the ion-exchange device, the first cationic-exchange membrane, the first anionic-exchange membrane, and the second cationic-exchange membrane comprise a thickness equal to or less than 0.020 inches.

In some embodiments of the ion-exchange device, the first plurality of channels are arranged in a first array configuration and the second plurality of channels are arranged in a second array configuration.

In some embodiments of the ion-exchange device, the channels of the first plurality of channels of the first array configuration extend from an inlet opening radially outward towards the first internal cavity of the first spacer border.

In some embodiments of the ion-exchange device, the first spacer comprises a third opening, a third plurality of channels, and a third array configuration, wherein the channels of the third plurality of channels of the third array configuration extend from the first internal cavity radially inward towards the third opening of the first spacer border.

In some embodiments of the ion-exchange device, the first array configuration is spatially related to the third array configuration such that the first array configuration is a 180° rotation of the third array configuration with respect to a central location of the first spacer.

In some embodiments of the ion-exchange device, the first spacer mesh and the first spacer border are integral, and the second spacer mesh and the second spacer border are integral.

In some embodiments of the ion-exchange device, the first spacer mesh and the first spacer border are separate components, and the second spacer mesh and the second spacer border are separate components.

In some embodiments, a method of fabricating a spacer for an ion-exchange device is provided, the method comprising: masking two sides of a polymer film roll; forming a polymer sheet from the polymer film roll; and cutting the polymer sheet using a laser engraver to form a plurality of channels, wherein each channel of the plurality of channels comprises a width of 0.005 inches to 0.015 inches.

In some embodiments of the method, cutting the polymer sheet comprises forming an internal cavity and one or more openings in the polymer sheet to form a spacer border.

In some embodiments of the method, cutting the polymer sheet comprises cutting a spacer border and a spacer mesh integrally.

In some embodiments of the method, the polymer of the polymer film roll and the polymer sheet comprises a stiffness greater than 2.5 GPa.

In some embodiments of the method, the polymer of the polymer film roll and the polymer sheet is polyethylene terephthalate.

In some embodiments of the method, masking two sides of a polymer film roll comprises applying a low tack paper masking to two sides of a polymer film roll.

In some embodiments of the method, the thickness of the spacer has a tolerance of less than 0.002 inches.

In some embodiments of the method, cutting the polymer film sheet comprises configuring the laser engraver to a laser speed of 30-40 inches per second.

In some embodiments of the method, cutting the polymer film sheet comprises configuring the laser engraver to a power of 40 to 60 Watts.

In some embodiments of the method, cutting the polymer film sheet comprises configuring the laser engraver to a frequency of 2000 to 3000 pulses per inch.

In some embodiments of the method, cutting the polymer film sheet comprises configuring the laser engraver to a focus of 2 inches+/−0.005 inches.

BRIEF DESCRIPTION OF THE FIGURES

The invention will now be described, by way of example only, with reference to the accompanying drawings, in which.

DETAILED DESCRIPTION OF THE DISCLOSURE

Described are spacer borders and ion-exchange devices and methods for fabricating spacer borders for use in an ion-exchange device. As described above, the performance of an ion-exchange device relies on the distribution of fluid flow across the ion-exchange membranes of the device, as well as the reliability and effectiveness of the internal seals (i.e., seals between adjacent intermembrane chambers) and external seals (i.e., seals between an interior space and an exterior space of the device) of the device. Poor flow distribution decreases the capacity, production rate, and efficacy of an ion-exchange device. Poor internal seals introduce leaks and cross-contamination from one intermembrane chamber to an adjacent intermembrane chamber. Poor external seals introduce safety hazards, leaks from an interior of the device to an exterior of the device, and contamination from the external environment. Accordingly, embodiments provided herein can improve fluid flow distribution through intermembrane chambers and across ion-exchange membranes, can improve internal seals along an exterior surface, and can improve internal seals between adjacent intermembrane chambers of an ion-exchange device.

Ion-exchange systems and devices disclosed herein can include at least one pair of electrodes and at least one pair of ion-exchange membranes placed there between. The at least one pair of ion-exchange membranes can include a cation-exchange membrane ("CEM") and an anion-exchange membrane ("AEM"). In addition, at least one of the ion-exchange membranes (i.e., CEMs and/or AEMs) has a spacer on the surface of the ion-exchange membrane facing the other exchange membrane in an ion-exchange device. In some embodiments, both the CEMs and the AEMs have a spacer on at least one surface facing the other ion-exchange membrane. The spacer can include a spacer border and a spacer mesh.

Figure 1:
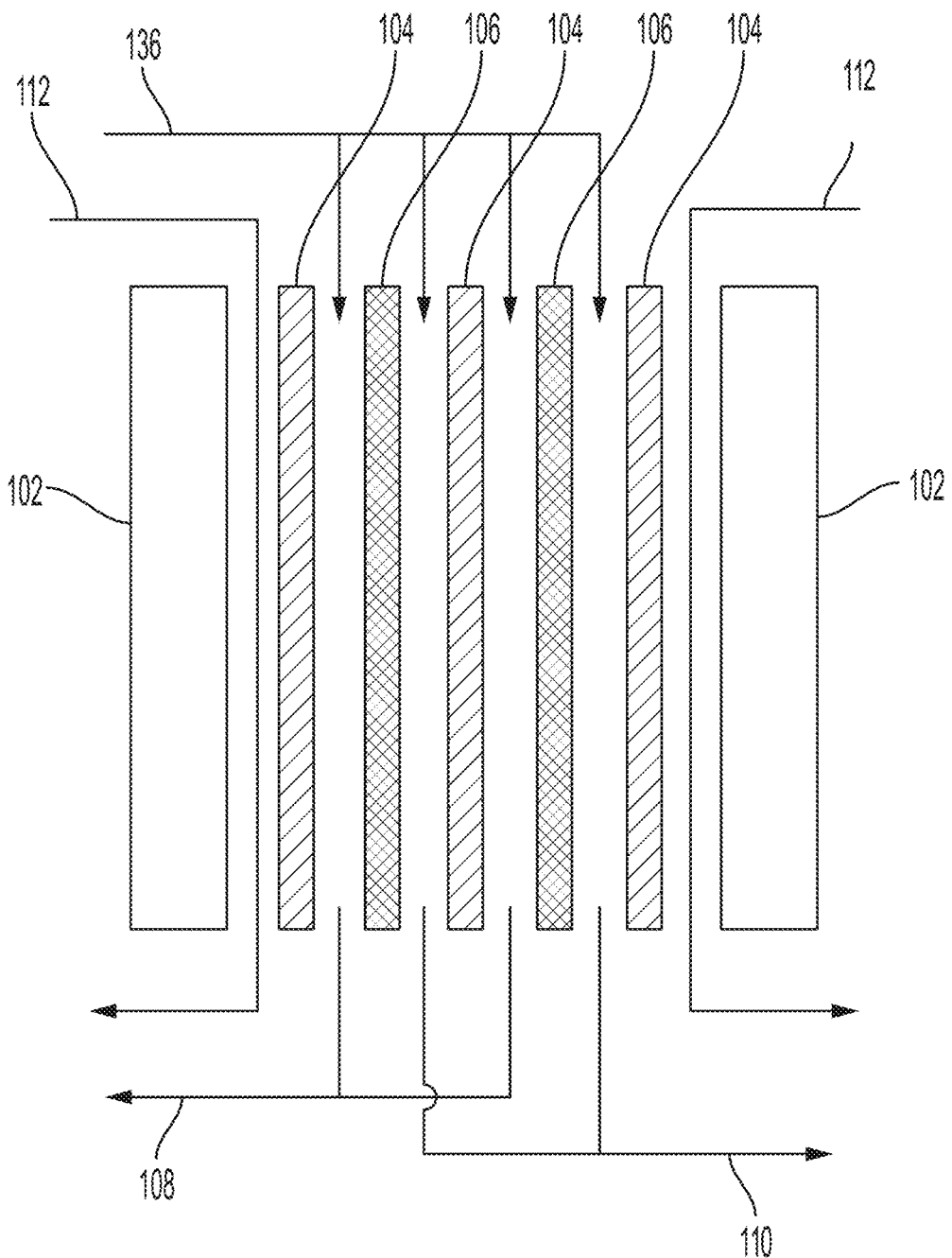
FIG. 1 illustrates a schematic side view of an ion-exchange device, according to some embodiments.

FIG. 1 shows a schematic side view of ion-exchange system 100 according to some embodiments disclosed herein. Ion-exchange system 100 can include CEMs 104 and AEMs 106 sandwiched between two electrodes 102. In some embodiments, one or more CEM 104 and one or more AEM 106 may alternate throughout a length of the ion-exchange device 100.

An electrode 102 is shown on opposing ends of ion-exchange device 100. One electrode 102 can be a cathode and another electrode 102 can be an anode. In some embodiments, one or more electrodes 102 can encompass one or more fluid channels for electrolyte stream 112. For example, a fluid channel for electrolyte stream 112 of electrode 102 can be located between one or more CEM 104 and an electrode 102, or between one or more AEM 106 and an electrode 102. Ion-exchange device 100 may also include one or more fluid channels for influent stream 136. One or more influent stream 136 may be located between a CEM 104 and an AEM 106. Influent stream 136 can comprise water. In some embodiments, water of influent stream 136 may be purified by flowing through one or more intermembrane chambers located between two or more alternating CEM 104 and AEM 106.

AEM 106 can allow passage of negatively charged ions and can substantially block the passage of positively charged ions. Conversely, CEM 104 can allow the passage of positively charged ions and can substantially block the passage of negatively charged ions.

Electrolyte stream 112 may be in direct contact with one or more electrodes 102. In some embodiments, electrolyte stream 112 may comprise the same fluid as the fluid of influent stream 136. In some embodiments, electrolyte stream 112 may comprise a fluid different from the fluid of influent stream 136. For example, electrolyte stream 112 can be any one or more of a variety of conductive fluids including, but not limited to, raw influent, a separately managed electrolyte fluid, NaCl solution, sodium sulfate solution, or iron chloride solution.

In some embodiments, ion-exchange device 100 can include one or more spacers on at least one surface of a CEM 104 or an AEM 106. In some embodiments, one or more spacer may be located on two opposing surfaces of a CEM 104 and/or an AEM 106. Further, ion-exchange device 100 may include one or more spacers between any two adjacent ion-exchange membranes (i.e., between an AEM 106 and a CEM 104). The region formed between any two adjacent ion-exchange membranes by one or more spacers forms an intermembrane chamber.

When an electric charge is applied to one or more electrodes 102 of ion-exchange device 100, the ions of influent stream 136 flowing through an intermembrane chamber between any two ion-exchange membranes (i.e., one or more CEM 104 and one or more AEM 106) can migrate towards the electrode of opposite charge. Specifically, ion-exchange membranes comprise ionically conductive pores having either a positive or a negative charge. These pores are permselective, meaning that they selectively permeate ions of an opposite charge. Thus, the alternating arrangement of the ion-exchange membranes can generate alternating intermembrane chambers comprising decreasing ionic concentration and comprising increasing ionic concentration as the ions migrate towards the oppositely-charged electrode 102.

An intermembrane chamber can be formed from a spacer border and a spacer mesh and creates a path for fluids to flow. The number of intermembrane chambers may be increased by introducing additional alternating pairs of ion-exchange membranes. Introducing additional alternating pairs of CEMs 104 and AEMs 106 (and the intermembrane chambers formed between each pair of ion-exchange membranes) can also increase the capacity of ion-exchange device 100. In addition, the functioning ability of an individual ion-exchange cell (i.e., a single CEM 104 paired with a single AEM 106 to form a single intermembrane chamber) can be greatly augmented by configuring ion-exchange cells into ion-exchange stacks (i.e., a series of multiple ion-exchange cells.)

As described above, ions of influent stream 136 flowing through an intermembrane chamber can migrate towards electrode 102 of opposite charge when an electric current is applied to ion-exchange device 100. This separation mechanism can separate influent stream 136 into two different streams of opposite ionic charge. For example, when used for desalination, influent stream 136 may be separated into brine stream 108 and product stream 110. Brine stream 108 is generally a waste stream. In some embodiments, product stream 110 may have a lower ionic concentration than brine stream 108.

In some embodiments, product stream 110 may have a predetermined treatment level. For example, ion-exchange system 100 may be configured to remove several types of ions (e.g., monovalent ions, divalent ions, etc.) or it may be configured to remove a specific type of ion (e.g., arsenic, fluoride, perchlorate, lithium, gold, silver, etc.). Further, ion-exchange system 100 can be held together using a compression system that comprises using two compression plates on opposite ends of the device. In some embodiments, a single pair of compression plates may be used (i.e., one on either end of the outside of the stack) to achieve a working, reliable seal.

Figure 2:
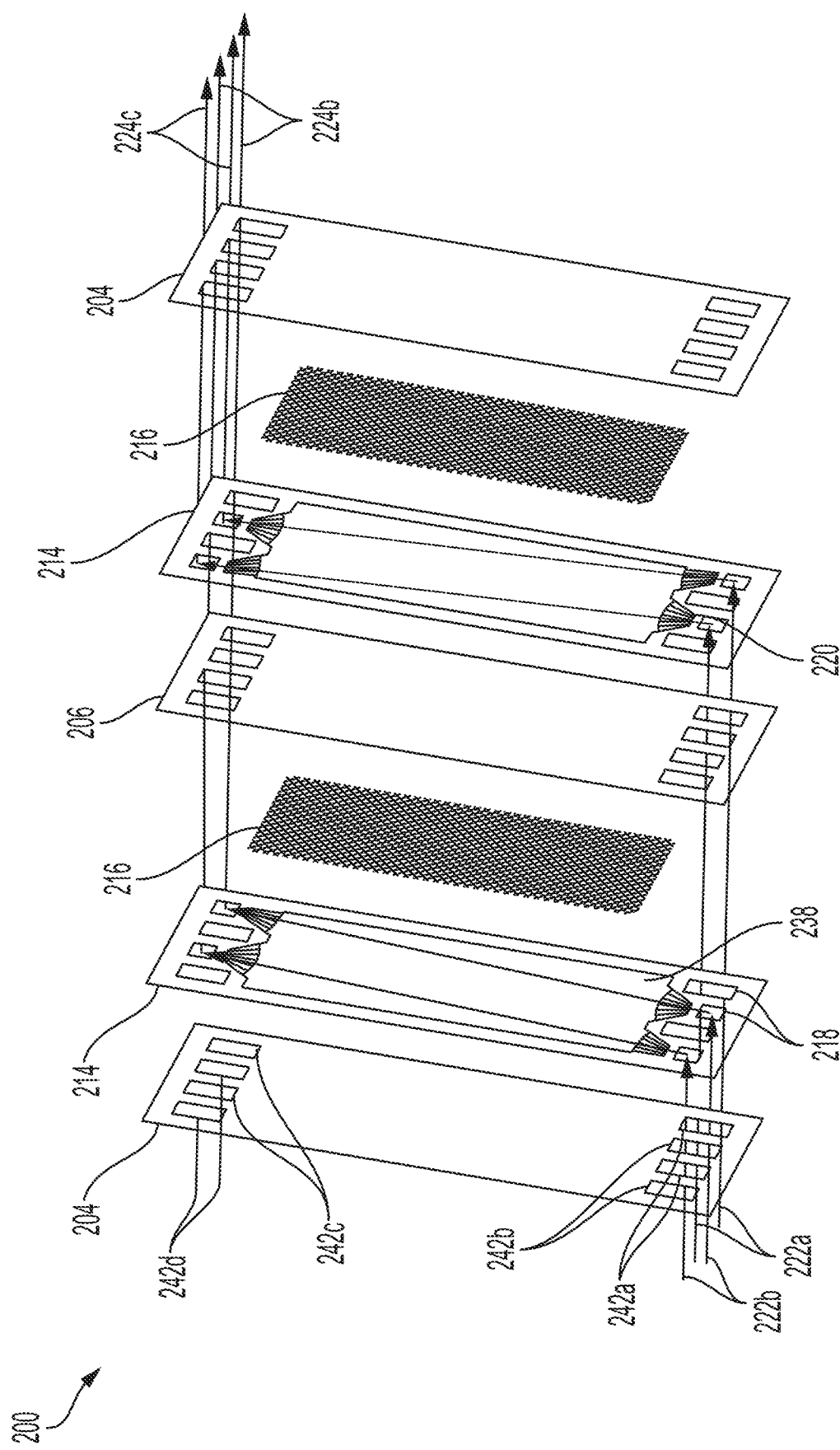
FIG. 2 illustrates an exploded view of the flow channels through an ion-exchange device, according to some embodiments.

To create intermembrane chambers between two ion-exchange membranes, spacers can be inserted between the ion-exchange membranes. FIG. 2 illustrates an exploded view of a portion of an ion-exchange device 200 that includes three ion-exchange membranes (two CEMs 204 and one AEM 206), two spacer meshes 216, and two spacer borders 214. The fluid flow path through these components is also shown (i.e., product flow path 222a, brine flow path 222b, product outlet 224a and brine outlet 224b).

In FIG. 2, stacking arrangement of ion-exchange membranes and spacers (including spacer borders 214 and spacer meshes 216) is shown sequentially as CEM 204, spacer mesh 216 and spacer border 214, AEM 206, spacer mesh 216 and spacer border 214, and CEM 204. Pairs of ion-exchange membranes require separation (in the form an intermembrane chamber) to allow fluid to flow between them. Typically, a non-conductive spacer mesh 216 and spacer border 214 pair can provide the separation between the membrane pairs, forming an intermembrane chamber. In some embodiments, spacer border 214 and spacer mesh 216 may be separate components. In some embodiments, spacer border 214 and spacer mesh 216 may be integrated as a single component. In actual use, the ion-exchange membranes and spacer border/spacer meshes can be sandwiched together such that spacer border 214 can seal against the ion-exchange membranes and provide contained intermembrane chambers. Fluid can pass through the intermembrane chambers for treatment.

When these components are sandwiched together as described above, openings 218 located along a top edge and a lower edge of each spacer border 214 (with respect to FIG. 2) can create inlet and outlet openings. As shown in FIG. 2, openings 218 include at least two product water inlet openings 242a, at least two brine water inlet openings 242b, at least two brine water outlet openings 242c, and at least two product water outlet openings 242d. A large internal cavity 238 of spacer border 214 can include a spacer mesh 216 used to maintain separation between membranes in the ion-exchange system 200. In addition, spacers (i.e., spacer border 214 and spacer mesh 216) can provide torturous paths for the fluid to flow. This increased turbulence can increase the flow distribution through the intermembrane chamber, increasing the performance and effectiveness of ion-exchange device 200.

In addition to openings 218, each spacer border 214 can also include a series of channels 220. Channels 220 can be etched into spacer border 214 according to specific dimensions and/or a specific orientation to achieve a particular outcome. For example, in some embodiments, channels 220 may be configured to distribute water flow maximally across the surface area of spacer mesh 214.

In some embodiments, as shown in FIG. 2, the inlet of product flow paths 222a and brine flow paths 222b alternate based upon the location of their inlet openings (i.e., product water inlet openings 242a and brine water inlet openings 242b). In some embodiments, channels 220 are etched into spacer border 214 to direct fluid to internal cavity 238 and to increase fluid distribution across spacer mesh 216 and the intermembrane chamber corresponding to that specific spacer border 214 and spacer mesh 216.

The specific orientation of a plurality of channels 220 may also impact the performance of ion-exchange device 200. For example, channels 220 of FIG. 2 are shown in an "array" configuration. Other orientations/configurations may include rectangles, straight lines, triangles, or any other suitable configuration. In addition, channels 220 may be straight, as shown in FIG. 2, or they may comprise curves and/or angles/corners. In some embodiments, a plurality of narrow channels 220 may converge, forming a single wide channel 220, or a single wide channel 220 may divide into a plurality of narrow channels 220. In some embodiments, the width of one or more channels 220 may change along a length of the channel. For example, one or more channels 220 may expand to comprise a greater width as the channel 220 approaches the intermembrane chamber. In some embodiments, one or more channels 220 may converge to a smaller width as the channel 220 approaches the intermembrane chamber.

Each membrane (i.e., CEM 204 and AEM 206) can include one or more openings which, when combined with one or more spacer border 216, create one or more opening 218 along a length of the ion-exchange device 200. The one or more opening 218 and the geometry of the spacer border 214 and spacer mesh 216 can allow fluids to flow into channels 220 and across the contained area created by the spacer border. For example, in FIG. 2, fluid can be introduced at inlet opening along a bottom of ion-exchange device 200 (with respect to FIG. 2). The fluid can flow up along channels 220 of a spacer border 216, across a spacer mesh 214, through channels 220 of a spacer border 216, and to one or more outlet opening 218 at a top of ion-exchange device 200.

As shown in FIG. 2 and described above, openings 218 along a bottom of ion-exchange device 200 (with respect to FIG. 2) alternate between product water inlet openings 242a and brine water inlet openings 242b. Openings 218 along a top of ion-exchange device 200 (with respect to FIG. 2) alternate between product water outlet openings 242d and brine water outlet openings 242c. Further, as shown by the arrows, the fluid flows diagonally across spacer mesh 216 and the intermembrane chamber corresponding to that particular spacer mesh 216. Thus, the outlet openings (i.e., brine water outlet openings 242c and product water outlet openings 242d) are located diagonally across spacer mesh 216 from the respective inlet openings (i.e., brine water inlet openings 242b and product water inlet openings 242a). In some embodiments, this particular flow pattern may help maximize fluid distribution across a membrane surface.

However, the configuration of openings 218 and the flow path across spacer mesh 216 may take different forms. Unlike the alternating openings 218 discussed above, product water inlet openings 242a may be grouped together and brine water inlet openings 242b may be grouped together. In some embodiments, the outlet openings (i.e., brine water outlet openings 242c and product water outlet openings 242d) may not be located diagonally across the spacer mesh 216 from the respective inlet openings (i.e., brine water inlet openings 242b and product water inlet openings 242a) to generate a diagonal fluid flow across spacer mesh 216, as described above. Instead, one or more of the product flow path 222a and brine flow path 222b may be directed to flow directly across in a horizontal or vertical direction across spacer mesh 216. As shown in FIG. 2, inlet openings are positioned along a bottom of ion-exchange device 200 and outlet openings are positioned along a top of ion-exchange device 200. In some embodiments, inlet openings may be located along a top of ion-exchange device 200, and outlet openings may be located along a bottom of ion-exchange device. In some embodiments, openings may be located along a left or a right side of ion-exchange device 200. Other suitable configurations of openings and flow paths across spacer mesh 216 are readily conceivable by one having ordinary skill in the art.

Figure 3:
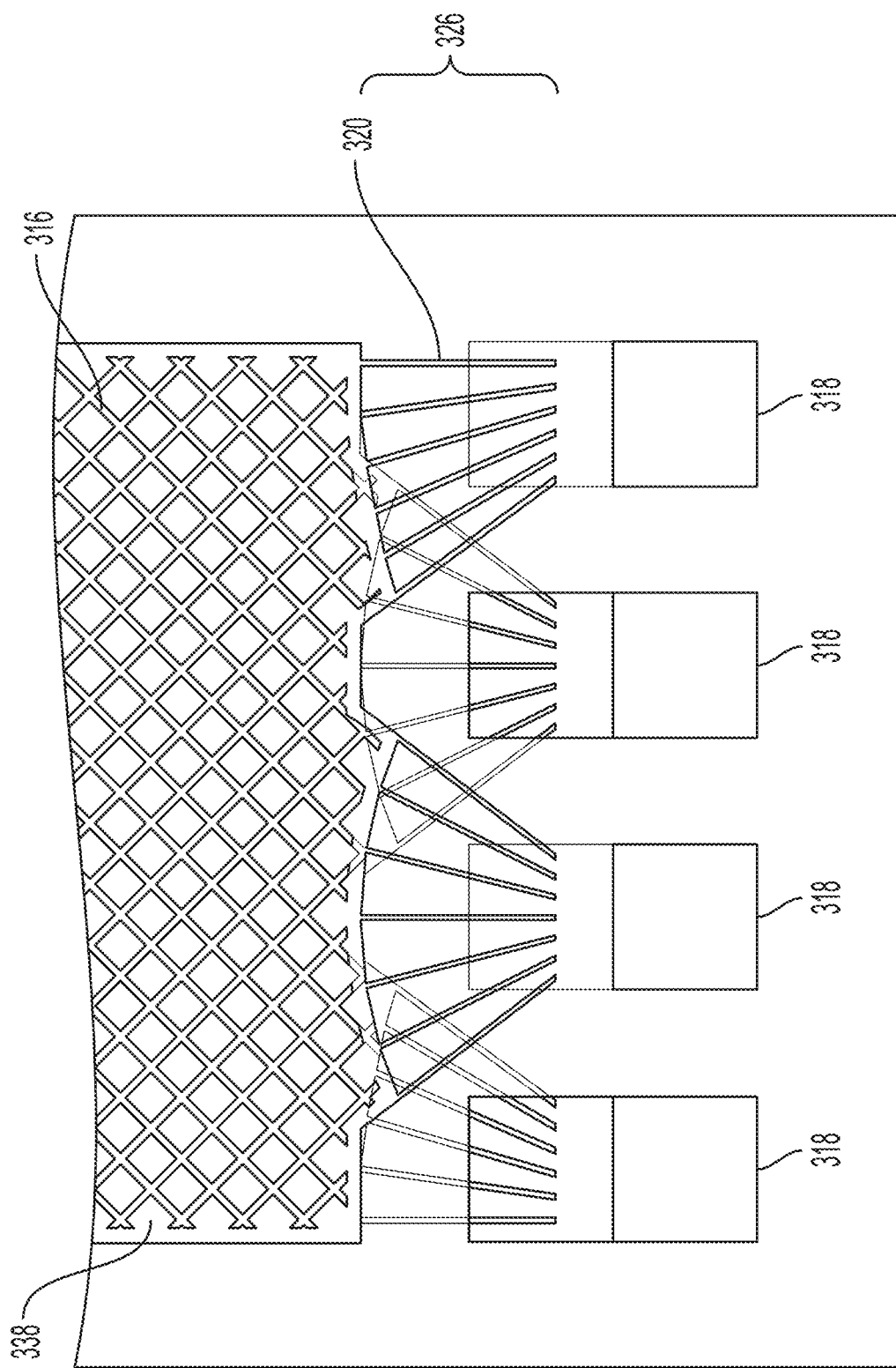
FIG. 3 illustrates a close-up front view of an ion-exchange device, according to some embodiments.

FIG. 3 demonstrates a close-up front view of a portion of a spacer stack 300 comprising a plurality of spacer borders 314 and a plurality of spacer meshes 316. In particular, FIG. 3 shows a stack of spacers configured to distribute fluid to at least two separate intermembrane chambers using openings 318 of at least two different sizes and/or shapes and a series of channels 320 etched in each spacer border 314. In some embodiments, a spacer of spacer stack 300 may comprise a spacer border 314, an internal cavity 338, a spacer mesh 316, channels 320, one or more configurations 326 comprising one or more channels 320, and two or more openings 318.

Like channels 220 of FIG. 2, channels 320 of FIG. 3 are etched in an array configuration 326. In particular, one or more array configuration 326 is comprised of narrow flow channels extending from internal cavity 338 towards opening 318. FIG. 3 illustrates the relationship between an array 326 of channels 320 of a first spacer border 314 and an array 326 of channels 320 of a second spacer border 314. In the configuration shown, one or more channel 320 of each array 326 of a first spacer border 314 (e.g., a topmost spacer border) overlaps with one or more channels 320 of an array 326 of a second spacer border 314 (e.g., an underlying spacer border). This overlapping configuration can encourage and improve water distribution across the intermembrane chamber.

As shown, channels 320 of FIG. 3 are etched in the configuration of an array 326. However, other configurations may be generated, such as rectangles, straight lines, triangles, or any other suitable configuration. In addition, channels 320 may be straight, as shown in FIG. 3, or they may comprise curves and/or angles/corners. In some embodiments, a plurality of narrow channels 320 may converge, forming a single wide channel 320, or a single wide channel 320 may divide into a plurality of narrow channels 320. Channels 320 can also be etched such that each one is approximately equal in length. Having a plurality of channels 320 that are approximately equal in length may allow an equal pressure drop across each channel. However, some suitable configurations may allow for channels 320 of various lengths.

FIG. 3 also shows the configuration of openings 318 when two or more spacers are stacked together. The heavy lines of FIG. 3 represent features of the topmost spacer and/or features of an underlying spacer that are visible through openings of the topmost spacer. The lighter lines represent features of the underlying spacer that are covered by the topmost spacer and/or not visible through an opening of the topmost spacer. Each smaller square-shaped opening 318 comprises a channel array 326 extending from the internal cavity towards the opening. Fluid directed through these square-shaped openings can enter channel array 326 and be transported across spacer mesh 316 and corresponding intermembrane chamber. Each larger rectangular-shaped opening 318 exposes a portion of a channel array 326 of an underlying spacer. Fluid directed through these openings can pass through the rectangular-shaped opening of a first spacer (e.g., the topmost spacer) and to the channel array 326 of a second spacer (e.g., an underlying spacer). From there, the fluid may be transported through channels 320 of array 326 and across spacer mesh 316 and the accompanying intermembrane chamber of the second spacer.

Spacer borders 314 and openings 318 can be of various geometries and are not limited to the geometries described herein and/or represented in the figures. For example, circles, diamonds, or combinations of numerous shapes may be used for either feature. Furthermore, openings 318 can be spaced further apart or closer together depending on the fluid treatment specifications. In some embodiments, the size and/or shape of openings 318 may vary and/or alternate on a single spacer border 314. For example, on the topmost spacer border 314, from left to right is a larger rectangular opening, a smaller square opening, a larger rectangular opening, and a smaller square opening. In some embodiments, openings 318 may alternate in size from one spacer to the next in a stack of spacers. For example, topmost spacer border 314 comprises a larger, rectangular-shaped opening 318 positioned at a far left side of spacer border 314. In a stack of spacers, the shapes of each opening that align with this particular rectangular-shaped opening 318 when a plurality of spacers (and optionally ion-exchange membranes) are stacked together may alternate from one spacer to the next.

Figure 4:
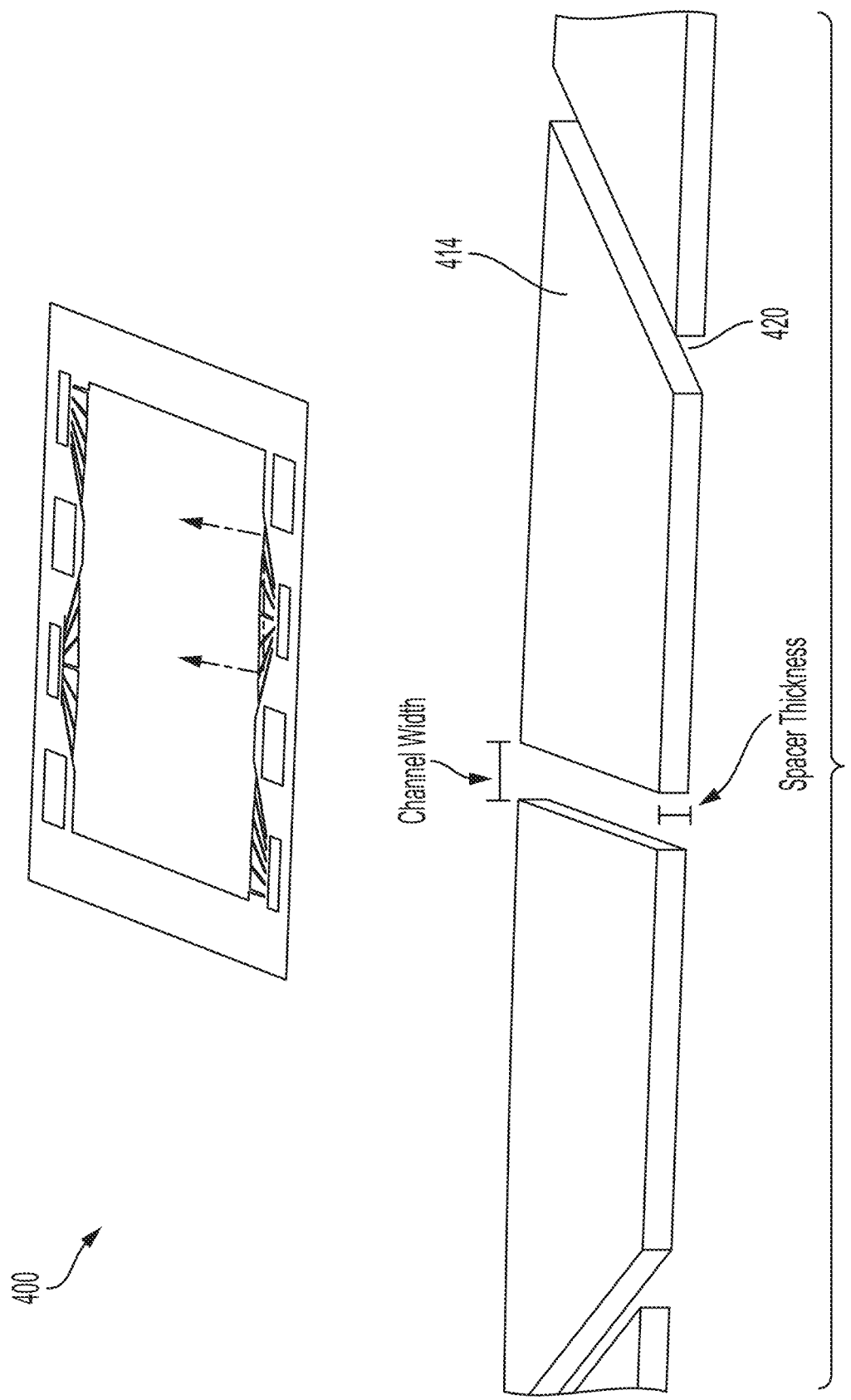
FIG. 4 illustrates close-up view of a channel of a spacer border, according to some embodiments.

FIG. 4 provides a close-up view of channels 420 of a spacer 400. In particular, FIG. 4 indicates specific dimensions that may be considered during design and fabrication of spacer 400 and may directly impact the external sealing capabilities, internal sealing capabilities, and/or flow distribution across an intermembrane chamber.

The thickness of the ion-exchange membranes (i.e., CEMs and AEMs) of an ion-exchange device may impact the risk of membrane bridging (described below with respect to FIG. 6) and internal leaking. For example, a relatively thick ion-exchange membrane may extrude into one or more channels 420 and effectively block fluid flow. Further, due to compressive forces placed on the ion-exchange membrane stack in an ion-exchange device, relatively thinner ion-exchange membranes may have a tendency to form channels on a side of the ion-exchange membrane opposite channels 420, allowing fluid from an adjacent intermembrane chamber to leak into the affected intermembrane chamber. Thus, to minimize these adverse effects, it has been determined that the thickness of the ion-exchange membrane layers may be from 0.001 inches to 0.030 inches. In some embodiments, the thickness of the ion-exchange membrane layer may be from 0.001 inches to 0.020 inches, from 0.001 inches to 0.015 inches, or from 0.001 inches to 0.010 inches. In some embodiments, the thickness of the ion-exchange membrane layer may be greater than 0.001 inches, greater than 0.003 inches, greater than 0.005 inches, greater than 0.010 inches, greater than 0.015 inches, greater than 0.020 inches, or greater than 0.025 inches. In some embodiments, the thickness of the ion-exchange membrane layers may be less than 0.030 inches, less than 0.025 inches, less than 0.020 inches, less than 0.015 inches, less than 0.010 inches, less than 0.008 inches, less than 0.005 inches, or less than 0.003 inches.

Spacer border 414 well-suited for sealing ion-exchange membranes described above may comprise a thickness of 0.001 inches to 0.050 inches. In some embodiments, spacer border 414 may comprise a thickness from 0.003 inches to 0.040 inches, from 0.005 inches to 0.030 inches, or from 0.006 inches to 0.010 inches. In some embodiments, spacer border 414 may comprise a thickness less than 0.050 inches, less than 0.040 inches, less than 0.030 inches, less than 0.020 inches, less than 0.010 inches, less than 0.008 inches, less than 0.006 inches, less than 0.005 inches, less than 0.003 inches, or less than 0.002 inches. In some embodiments, spacer border 414 may comprise a thickness greater than 0.001 inches, greater than 0.003 inches, greater than 0.005 inches, greater than 0.007 inches, greater than 0.009 inches, greater than 0.010 inches, greater than 0.020 inches, greater than 0.030 inches, or greater than 0.040 inches.

As mentioned above, channels 420 may be etched into spacer border 414 according to specific dimensions and/or a specific orientation. For example, the width of an individual chamber 420 and any difference in width from a first channel 420 to a second channel 420 can be critical to performance of ion-exchange device 420. In some embodiments, a channel 420 width from 0.001 inches to 0.020 inches or 0.005 inches to 0.015 inches may be used, particularly for a fluid having a conductivity of <10,000 µS/cm or <5,000 µS/cm. A channel 420 having a width according to these dimensions can result in better flow distribution, which can lead to a lower overall electrical resistance. In some embodiments, a channel 420 width may be less than 0.020 inches, less than 0.015 inches, less than 0.012 inches, less than 0.010 inches, less than 0.008 inches, less than 0.005 inches, or less than 0.003 inches. In some embodiments, a channel 420 width may be greater than 0.001 inches, greater than 0.003 inches, greater than 0.005 inches, greater than 0.008 inches, greater than 0.010 inches, greater than 0.012 inches, or greater than 0.015 inches. Ideally, any variation in channel cutting should be less than 0.002 inches. As described in more detail below, a laser cutting and masking procedure can be used to ensure these precise cuts.

Figure 5:
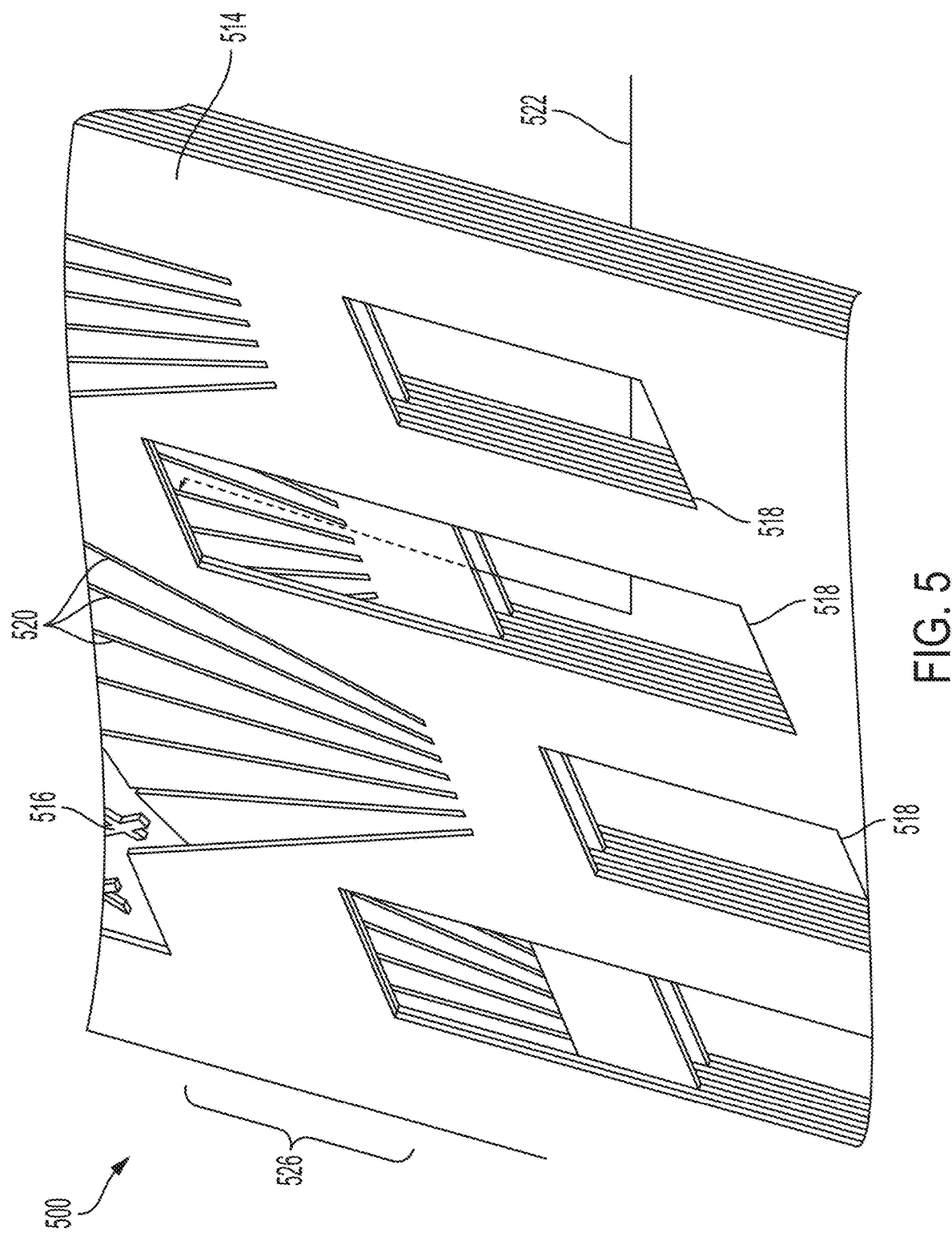
FIG. 5 illustrates a close-up view showing flow channels through an ion-exchange device, according to some embodiments.

FIG. 5 provides a closer look at the flow pattern through stack 500. In some embodiments, stack 500 may comprise a plurality of alternating CEMs and AEMs, each separated by one or more spacers (i.e., spacer border 514 and spacer mesh 516). Specifically, FIG. 5 illustrates a fluid flow path as it travels from inlet openings 518 to an intermembrane chamber. In some embodiments, fluid flows through inlet openings 518 to an array 526 of channels 520 and across spacer mesh 516 of an intermembrane chamber. In FIG. 5, fluid is shown entering from a rear side of stack 500. Specifically, fluid inlet stream 522 enters through a large rectangular opening 518 of a first spacer border 514 along a rear side of stack 500. Fluid stream 522 passes through this first rectangular opening 518 and to channels 520 of channel array 526 of a second spacer 514. Channels 520 transport fluid of fluid stream 522 across a length of channels 520 of array 526 to a spacer mesh 516. The fluid of fluid stream 522 then travels across spacer mesh 516 and the intermembrane chamber corresponding to the second spacer border 514.

Figure 6:
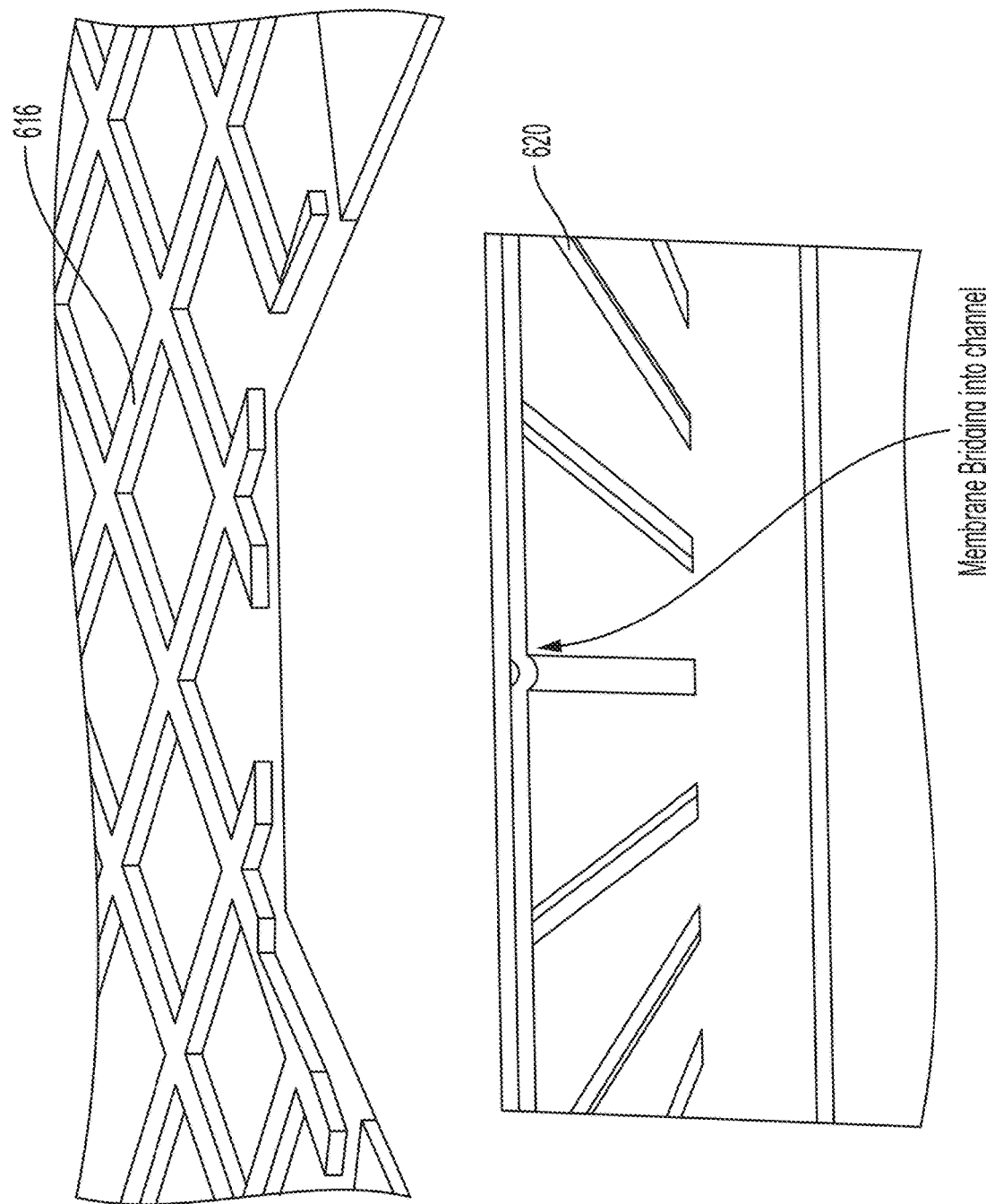
FIG. 6 illustrates a close-up view of membrane bridging into a channel, according to some embodiments.

FIG. 6 shows a close-up view of spacer 600. In particular, membrane bridging is occurring in spacer 600. Membrane bridging in an example of an internal leak that can occur when a leak path (e.g. leak path 630) is created by the membrane in between narrow channels 620. Membrane bridging can cause cross-contamination of fluid from one intermembrane chamber to an adjacent intermembrane chamber in addition to other poor performance characteristics of an ion-exchange device. The severity of membrane bridging can depend on the material of the spacer 600 and/or the thickness of channels 620. However, some membrane bridging may occur without producing any catastrophic effects on the performance of an ion-exchange device according to some embodiments described herein. These are discussed in detail below, particularly with respect to FIG. 7.

In some embodiments, spacer border 614 may be fabricated from a single polymer sheet. In some embodiments, both spacer border 614 and spacer mesh 616 may be fabricated as a single component from a single polymer sheet. The polymer used to fabricate spacer border 614 and/or spacer mesh 616 may include polyethylene terephthalate (PET), polyethylene, ethylene propylene diene terpolymer (EDPM), elastomeric materials, or any other suitable materials.

Figure 7:
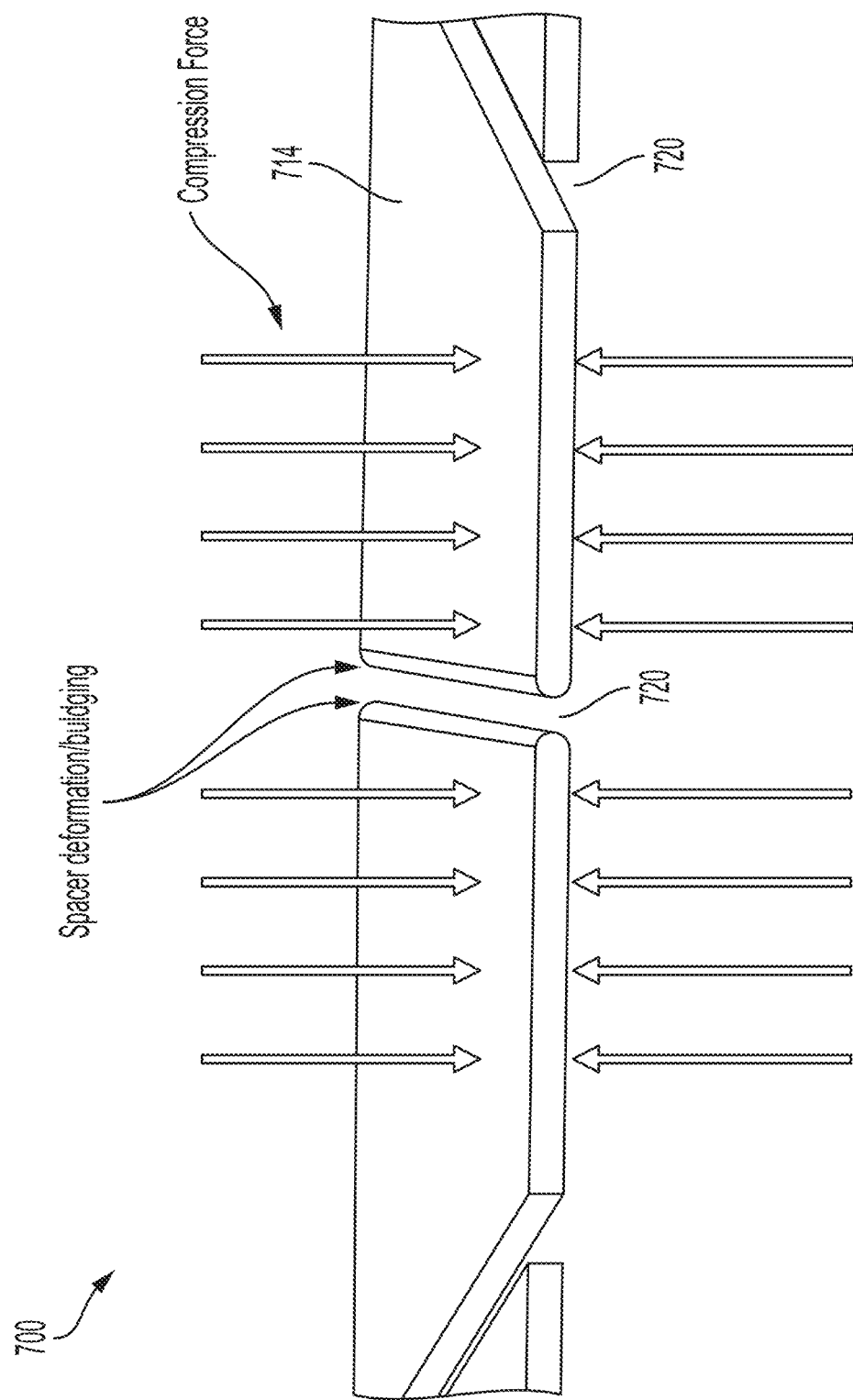
FIG. 7 illustrates a form of spacer border deformation, according to some embodiments.

FIG. 7 illustrates possible deformation of spacer border 714 that can occur in some embodiments. In particular, compressive forces required to effectively seal a stack of spacers and ion-exchange membranes in an ion-exchange device can cause material of spacer border 714 to bulge or flow into channel 720 itself, creating an obstruction within channel 720. Obstructions caused by the deformation will increase the flow resistance in channel 720 and can possibly cut off flow through channel 720 entirely.

For example, low modulus plastics (i.e., polyethylene and elastomeric materials such as EPDM and neoprene) are susceptible to this type of deformation and thus may not be ideal materials to use in some embodiments. If used, spacer borders fabricated of these low modulus plastics may be prepared with relatively wide channels (e.g., greater than 0.020 inches). In some embodiments, spacer borders of these materials may utilize a mesh or insert to bridge channel and seal the adjacent ion-exchange membranes.

On the other hand, polyethylene terephthalate (PET) film and other plastics comprising a stiffness of greater than 2.5 GPa can resist deformation more effectively than the low modulus plastics described above. Thus, thinner channels may be etched into the spacer border film without forming large obstructions under compression. Additionally, PET films are typically rigid enough to maintain the channel geometry during manufacturing, whereas less rigid materials may be more susceptible to damage or deformation causing the channel gaps to vary or move during assembly. These materials having a lower rigidity may result in inconsistent channel geometry and poor sealing as the line of force through the stack may be broken. More detail of spacer border fabrication techniques are provided below.

Figure 8:
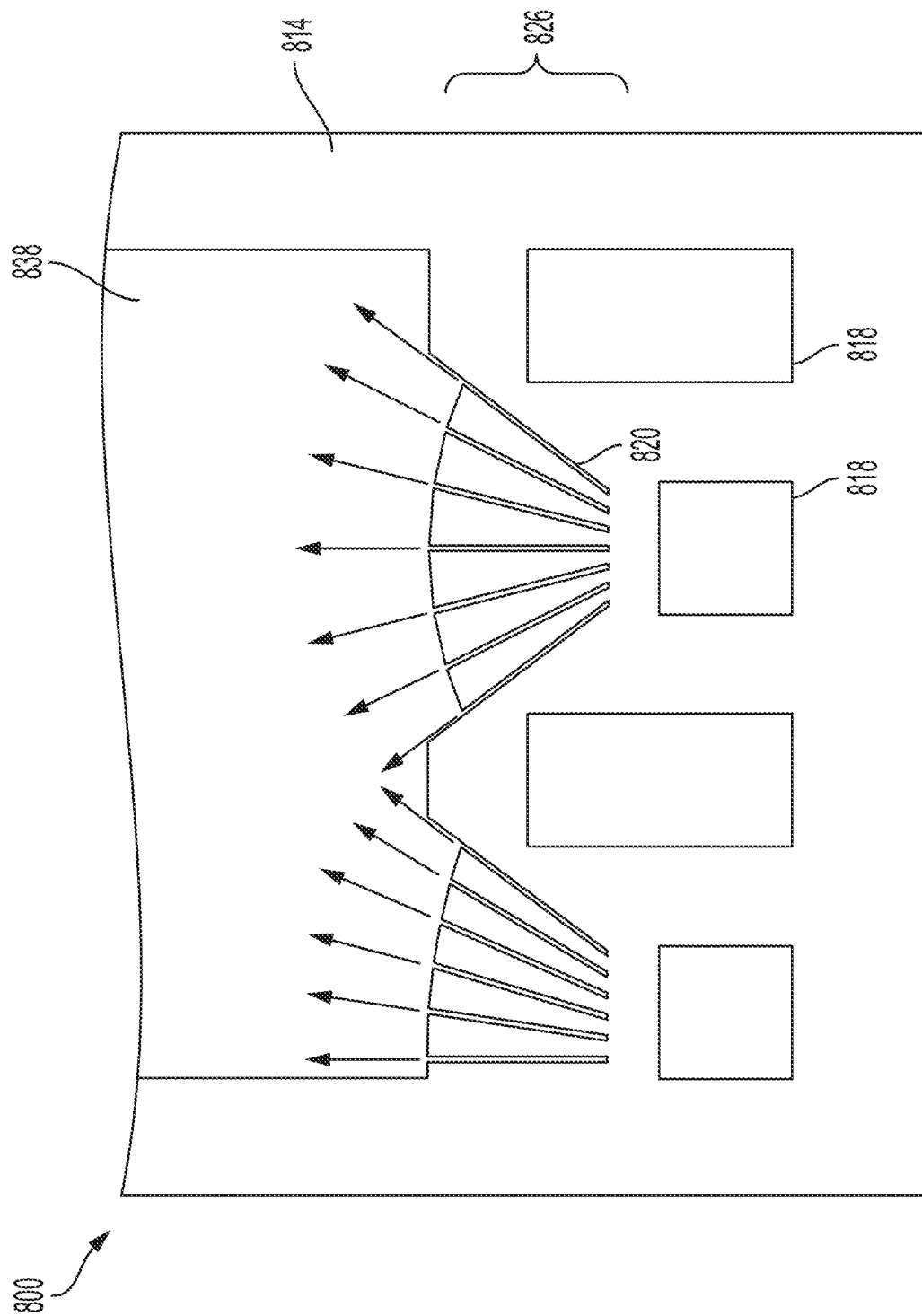
FIG. 8 illustrates a close-up view of flow distribution through individual channels and arrays of channels in a spacer border, according to some embodiments.

FIG. 8 illustrates fluid flow path of a single intermembrane chamber 800 according to some embodiments. Intermembrane chamber 800 comprises spacer border 814 and internal cavity 838. Spacer border 814 includes one or more openings 818, one or more channels 820, and one or more channel array 826. As shown, when fluid enters a channel 820 at a location proximate to opening 818 corresponding to said channel 820, the fluid travels along a length of channel 820 until it reaches internal cavity 838. As shown in FIG. 8, a plurality of channels 820 is etched into the configuration of an array (i.e., array 826).

However, as discussed above, other configurations of channels 820 may also be reasonably used (i.e., rectangles, straight lines, triangles, etc.). In addition, channels 820 may be straight, as shown in FIG. 8, or they may comprise curves and/or angles/corners. In some embodiments, a plurality of narrow channels 820 may converge, forming a single wide channel 820, or a single wide channel 820 may divide into a plurality of narrow channels 820. Channels 820 can also be etched such that each one is approximately equal in length. Having a plurality of channels 820 that are approximately equal in length may allow an equal pressure drop across each channel. However, some suitable configurations may allow for channels 820 of various lengths.

The arrows shown in FIG. 8 illustrate a flow path of fluid as the fluid exits plurality of channels 820. Orienting channels 820 into one or more array configuration 826 allows for increased flow distribution across internal cavity 838 and the intermembrane channel formed from spacer border 814 and internal cavity 838, as indicated by the arrows provided. However, as discussed above, other configurations of channels 820 may be reasonably used as well.

Fabricating Spacer Borders for Use in Ion-Exchange Membrane

Figure 9:
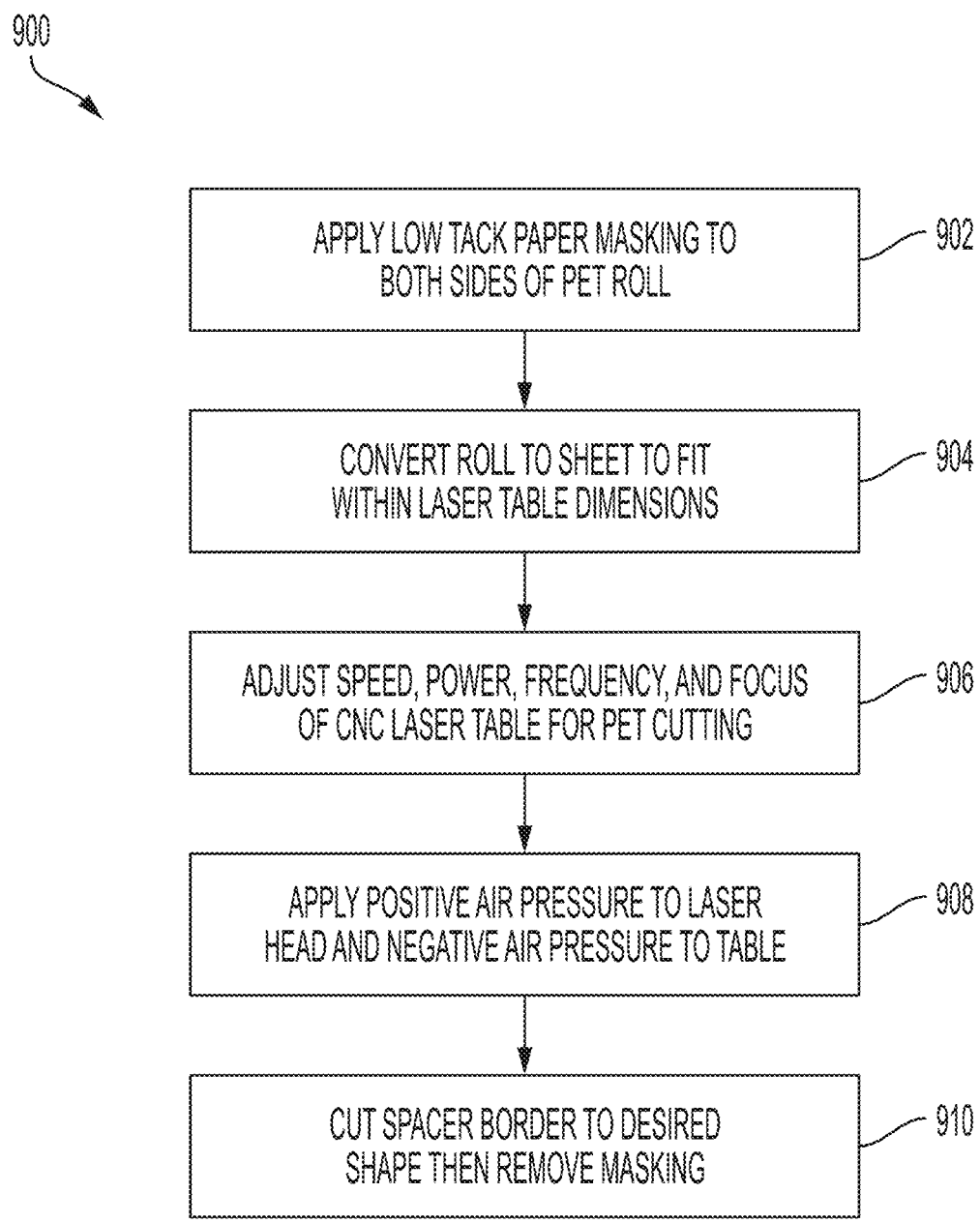
FIG. 9 illustrates a process flow chart of a fabrication process for a spacer border, according to some embodiments.

FIG. 9 provides a process flow chart for a method 900 of fabricating spacers (i.e., spacer border and/or spacer mesh) according to some embodiments herein. In some embodiments, a thin spacer border may be created from single component and provide all the benefits state above through a combination of spacer material, membrane material, and spacer geometry.

In step 902 of process 900, a low tack paper masking (e.g., paper back tape) is applied to both sides of a polymer film roll. Unlike a low tack paper back tape, a plastic back tape may fuse with the PET during laser cutting. Without a mask, the laser of the CNC laser engraver may locally melt the PET material in the region of the channels and cause the material being removed to fuse with the spacer border. This fusion creates an increased thickness of the spacer border in the region of the channel(s). Accordingly, to keep the material thickness variation to less than 0.002 inches, tape can be applied to both sides of the PET film. A single side of the PET roll may be masked, but the repeatability of the cutting process may suffer. As described above, the film used may include any suitable material such as PET, polyethylene, ethylene propylene diene terpolymer (EDPM), elastomeric materials, etc.

In some embodiments, the spacer border is composed of PET (i.e., polyethylene terephthalate). PET is a versatile plastic and compared to other conventional spacer materials, has a relatively high elastic modulus (3.5 GPa). PET also has a unique combination of relatively high stiffness while also having the ability to be molded into shapes with dimensions having tight tolerances. For example, stacks for an ion-exchange device can have a thickness tolerance of +/−0.0001 inches to form a reliable sealing surface. Variations in film thickness of much greater than 0.0001 inches can lead to problems including misalignment, leaking, increases in pressure drop, changing the flow pattern of adjacent layers, etc. Accordingly, other high modulus plastics (i.e., materials having a Young's modulus of greater than 2.5 GPa) may also be considered, but few materials have the unique combination of properties characteristic of PET.

In step 904, a PET roll is converted into a PET sheet in preparation for cutting and/or engraving. Specifically, the PET roll is cut into sheets in preparation for loading into a CNC laser engraver. Alternatively, a roll-fed laser engraver may be used, and the masking tape may be applied in a separate step, before the laser engraver.

In step 906 of process 900, the engraving machine is prepared to cut the PET film. In some embodiments, a laser engraving machine may be used to cut the film. In particular, process parameters such as the laser speed, power, frequency, and focus may be adjusted. The process parameters should be optimized such that the machine can cut the PET film with minimal melting outside of the region of the cut and such that the machine can cut the film in a single pass.

In some embodiments, the laser speed may be from 20 to 50 inches/second. In some embodiments, the laser speed may be from 30 to 40 inches/second. In some embodiments, the laser speed may be less than 50 inches/second, less than 40 inches/second, or less than 30 inches/second.

In some embodiments, the power of the machine may be from 30 to 80 Watts. In some embodiments, the machine may be powered at 40 to 60 Watts. In some embodiments, the machine may be powered at less than 80 watts, less than 70 Watts, less than 60 Watts, less than 50 Watts, or less than 40 Watts. In some embodiments, the machine may be powered at more than 30 Watts, more than 40 Watts, more than 50 Watts, more than 60 Watts, or more than 70 Watts.

In some embodiments, the frequency of the machine may be from 1000 to 4000 pulses per inch. In some embodiments, the frequency of the machine may be from 2000 to 3000 pulses per inch. In some embodiments, the frequency may be more than 1000, more than 1050, more than 2000, more than 2050, more than 3000, or more than 3050 pulses per inch. In some embodiments, the frequency of the machine may be less than 4000, less than 3050, less than 3000, less than 2050, less than 2000, or less than 1050 pulses per inch.

In some embodiments, the focus of the machine may be from 1 inch to 4 inches with a tolerance of +/−0.005 inches. In some embodiments, the focus of the machine may be from 2 inches to 3 inches with a tolerance of +/−0.005 inches. In some embodiments, the focus of the machine may be less than 4 inches, less than 3.5 inches, less than 3 inches, less than 2.5 inches, less than 2 inches, or less than 1.5 inches with a tolerance of +/−0.005 inches. In some embodiments, the focus of the machine may be more than 1 inches, more than 1.5 inches, more than 2 inches, more than 2.5 inches, more than 3 inches, or more than 3.5 inches with a tolerance of +/−0.005 inches.

In some embodiments, a CNC laser engraver is used to ensure the tight tolerances necessary when preparing stack components of an ion-exchange device. For example, an Epilog Fusion M2 40 (Epilog Laser) may be used. Other suitable laser cutting/engraving machines may be used as well. However, other cutting, engraving, and/or etching processes, such as die cutting and other mechanical methods, may not be desirable for creating clean, deformation-free patterns in the polymer film (i.e., PET film).

In step 908, positive air pressure is applied to a laser head of the CNC laser engraver (in the region of the cut), and negative air pressure is applied to a supporting table of the CNC laser engraver in preparation for etching. This air pressure balance can help remove the cut pieces away from the region of the cutting to prevent them from melting and fusing back to the PET film from which they were removed.

In step 910, after the cutting is complete, the mask may be removed. The cut spacer border may optionally be placed in a mixture of soap and water to assist in the removal of the mask and remove any remaining debris from the channels.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A spacer for an ion-exchange device comprising:
   a spacer mesh; and
   a spacer border comprising:
      an internal cavity surrounded by a perimeter of the spacer border;
      a first inlet opening and a second inlet opening within the perimeter of the spacer border, wherein the first inlet opening and the second inlet opening are located on adjacent sides of the internal cavity; and
      a plurality of channels located within the perimeter and between the first inlet opening and the internal cavity, wherein each channel of the first plurality of channels extends from the internal cavity towards the first inlet opening,
      wherein a total area of the first inlet opening is different than a total area of the second inlet opening.

2. The spacer of claim 1, wherein the spacer border comprises a polymer having a stiffness greater than 2.5 GPa.

3. The spacer of claim 1, wherein the spacer border comprises polyethylene terephthalate.

4. The spacer of claim 1, wherein each channel of the plurality of channels comprises a width from 0.005 inches to 0.015 inches.

5. The spacer of claim 1, wherein the plurality of channels is oriented in a first array configuration.

6. The spacer of claim 1, comprising a thickness of 0.003 inches to 0.020 inches.

7. The spacer of claim 1, comprising a thickness of 0.003 inches to 0.010 inches.

8. The spacer of claim 1, wherein an end of each channel of the plurality of channels opens into the internal cavity.

9. The spacer of claim 1, wherein the spacer mesh and the spacer border are integral.

10. The spacer of claim 1, wherein the spacer mesh and the spacer border are separate components.

* * * * *